United States Patent
Doreian et al.

[19]

[11] Patent Number: 5,879,077
[45] Date of Patent: Mar. 9, 1999

[54] DOUGH MIXING DEVICE HAVING A ROTATING KNEADING BLADE AND A MIXING TROUGH

[76] Inventors: Graeme Bruce Doreian; Bruce Douglas Doreian, both of P. O. Box 383, Dromana, Victoria, Australia, 3936

[21] Appl. No.: 951,279

[22] Filed: Oct. 16, 1997

Related U.S. Application Data

[63] Continuation of Ser. No. 264,569, Jun. 23, 1994, abandoned.

[51] Int. Cl.[6] .............................. A21C 1/06; A47J 43/07
[52] U.S. Cl. ............................................. 366/99; 366/331

[56] References Cited

U.S. PATENT DOCUMENTS

| | | | |
|---|---|---|---|
| 48,979 | 7/1865 | Ring | 366/99 |
| 61,206 | 1/1867 | Jones | 366/99 |
| 960,878 | 6/1910 | Friedman | 366/99 |
| 1,432,358 | 10/1922 | Podhajny | 366/97 X |
| 1,750,710 | 3/1930 | Fain | 366/99 |
| 4,197,018 | 4/1980 | Groen, Jr. | 99/348 X |
| 5,251,979 | 10/1993 | Larsen | 366/331 X |

FOREIGN PATENT DOCUMENTS 53-32465  3/1978  Japan ....................... 366/98

*Primary Examiner*—Charles E. Cooley
*Attorney, Agent, or Firm*—Shlesinger, Arkwright & Garvey LLP

[57] ABSTRACT

A hand-operated, dough-making machine has a box-like container (10) with parallel upper side wall portions, inclined lower side wall portions (13, 14) and a flat bottom (15); a removable beater (26) is turned by a removable handle (22) which has a cylindrical bearing portion (20) passable through circular holes in each end wall of the container and has a square plug (21) which is fitted into either of square sockets (33 & 34) in each end wall of the beater which are the ends of an optional sleeve extending through the beater, the beater blade is formed with flat end faces (27, 28), flat side faces (29, 30) and has a rounded top face (31) and an angled, flat-faced bottom edge (32) with an obtuse-angled leading edge A and an acute-angled trailing edge B; the beater is off-center so that the trailing edge sweeps more into the corners formed at the junction of vertical and sloping side-wall portions (11, 12, 13, 14) and sloping side wall portions (13, 14) and the flat bottom (15). A rod (25) has a knob (25a) at one end with a cylindrical bearing portion (23) passable through a hole in the container end wall and a square plug (24) fits into the square socket (33, 34) of the sleeve.

15 Claims, 4 Drawing Sheets

DOUGH MIXING DEVICE HAVING A ROTATING KNEADING BLADE AND A MIXING TROUGH

This application is a continuation of application Ser. No. 08/264,569, filed Jun. 23, 1994, now abandoned.

BACKGROUND OF THE INVENTION

This invention relates generally to doughmaking equipment and relates in particular to a hand-operated device having a special beater for kneading dough in a special container for home breadmaking and other dough-related products, but which may have other applications and could be adapted for use on a commercial scale using power equipment.

SUMMARY OF THE INVENTION

According to the invention there is provided a device for kneading of dough for breadmaking and other dough-related products, the device comprising a mixing container with walls defining a trough, a beater adapted to be placed within and removed from the trough, the beater being formed into a blade which has a rounded face and an angled face diametrically opposite to the rounded face.

According to one form of the invention the trough is formed with parallel upper side wall portions and lower side wall portions sloping downwardly and inwardly at an oblique angle to a flat bottom wall portion, and wherein the beater is mounted upon a shaft or shafts placeable within and removable from the trough and is manually rotatable by a handle mounted upon the shaft or shafts.

Preferably, the beater has a blade which is generally in the form of an elongate flat plate with wide-area flat and parallel side faces and narrow-area, flat, parallel, transverse end faces and with top and bottom longitudinal edges and faces parallel to and spaced radially from the shaft, wherein one axial "top" or "bottom" face is rounded while the other and diametrically-opposite "bottom" or "top" face is angled with respect to the side faces, presenting during rotation one obtuse-angled leading edge with respect to a longitudinal leading face and an acute-angled trailing edge with respect to a longitudinal trailing face.

In an alternative embodiment, the longitudinal leading face may be provided with a longitudinal ridge. It has been found that this longitudinal ridge assists in the mixing of small quantities of dough.

Preferably the rotational axis of the beater blade is laterally offset in a direction towards the obtuse angled leading edge of the blade to obtain a greater sweep of the blade with respect to inside surfaces of the trough.

According to a preferred form of the invention each end face of the beater blade is provided with a rectangular or square socket and the handle is provided with a plug of complementary shape to the shape of the socket, the plug being adapted to be passed through an aperture in either end wall of the trough for left-hand or right-hand operation respectively, and press-fitted into one of the sockets of the beater blade, after the blade has been placed in the trough, a separate plug housing a metal rod or shaft is adapted to be passed through an aperture in the opposite end wall of the trough and press-fitted into an end face of the beater opposite to the handle plug end face.

Preferably the trough end walls and the handle and plugs are provided with corresponding circular and/or cylindrical bearing surfaces to permit rotation of the beater when mounted within the trough and more preferably the beater has a hollow throughbore extending axially completely therethrough.

Preferably, the beater is of plastics material construction and has an optional plastics material sleeve extending axially completely therethrough and a metal rod is adapted to be inserted through the beater or and into a corresponding aperture 38 in the handle plug.

Throughout this specification it will be understood that the terms "top" and "bottom" are relative terms and have been used only for convenience and not in a limiting sense when describing the edges of the beater blade and could equally be used vice versa or in reverse without departing from the spirit and scope of the invention.

DESCRIPTION OF THE PREFERRED EMBODIMENTS

EXAMPLE I

A non-limiting example of an embodiment or practical arrangement of the invention will now be described with reference to the accompanying drawings.

Figure 3:
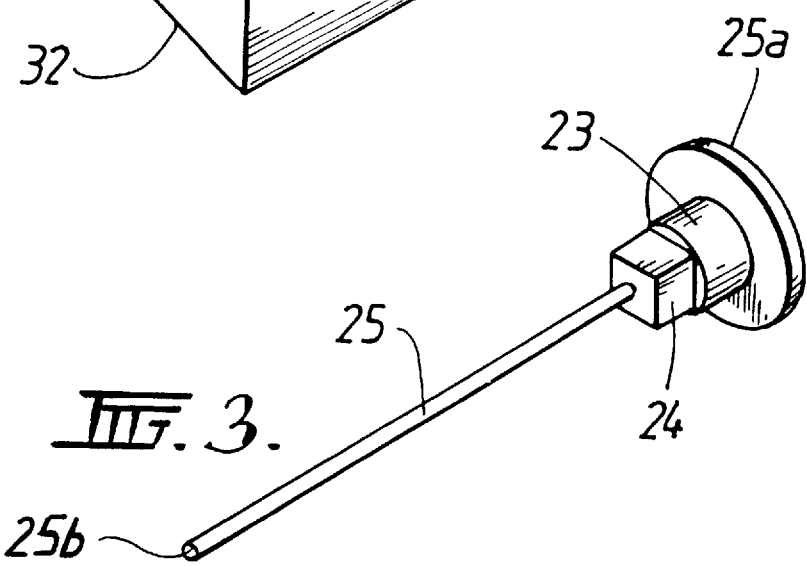
FIG. 3 is a perspective view of the rod and plug for the beater of FIG. 2.
Figure 4:
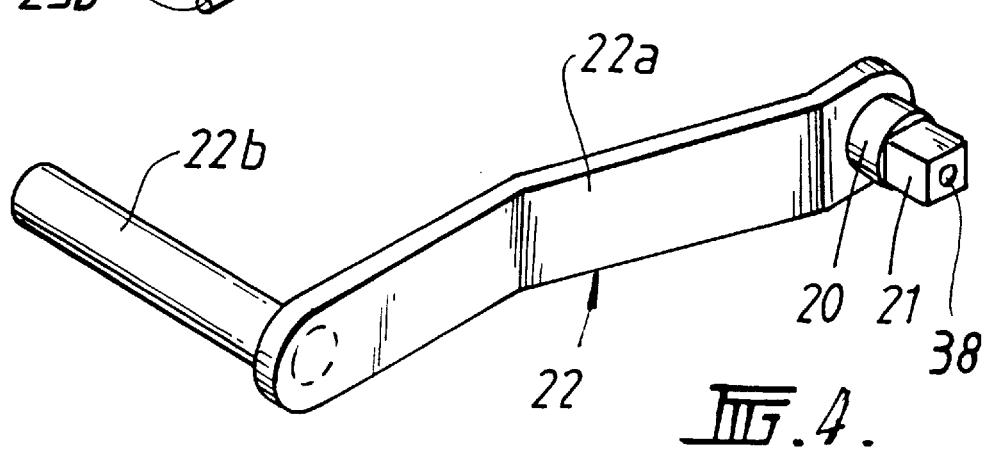
FIG. 4 is a perspective view of the handle for the beater of FIG. 2.
Figure 7:
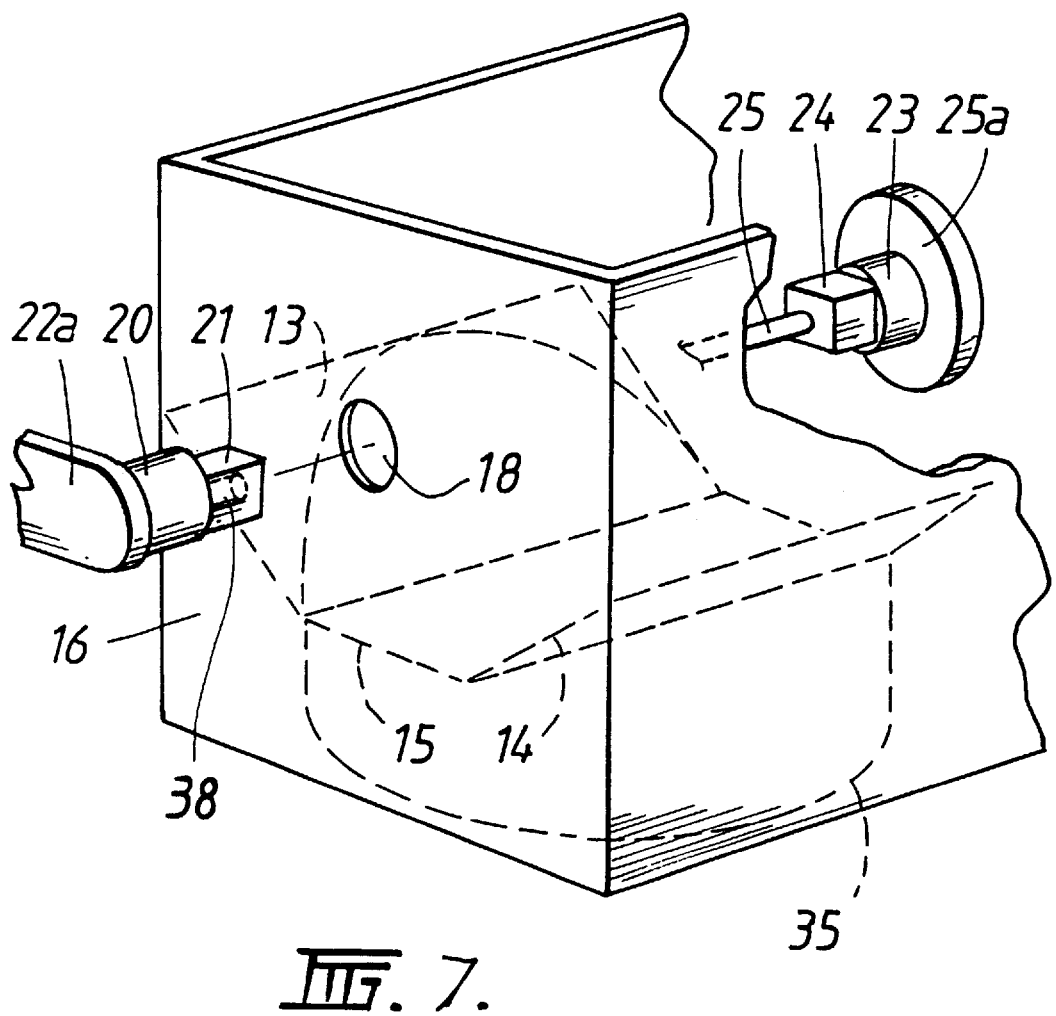
FIG. 7 is a pre-assembly, perspective partial view showing the relationship of the handle and rod plugs in relation to the trough.

Referring to the drawings, there is shown a hand-operated device for kneading of dough for home breadmaking or other dough-related products. The device comprises a housing 10 for a trough 10a both of which can be made of wood, plastics material or metal and which has side walls with parallel upper portions 11, 12 and downwardly and inwardly sloping lower wall portions 13, 14 with lower edges or corners joined at an oblique angle to a flat bottom-wall portion 15, one of the sloping wall portions being at a higher level than the other, all of the side wall portions being joined to parallel end walls 16, 17. All of the wall portions define a trough for home bread-making dough ingredients. The two end walls 16,17 of the container are substantially at right angles to the bottom wall 15 and are each provided with a circular opening 18,19 through each of which is respectively adapted to pass (referring to FIGS. 3, 4 and 7) a cylindrical bearing portion 20 and square (or rectangular) plug 21 of a handle 22 and the cylindrical bearing portion 23 and square (or rectangular) plug 24 of a knob 25a on a handle-supporting a rod or shaft 25. The square or rectangular plug 21 contains an aperture 38 into which the end 25b of rod 25 can be removably inserted.

Figure 1:
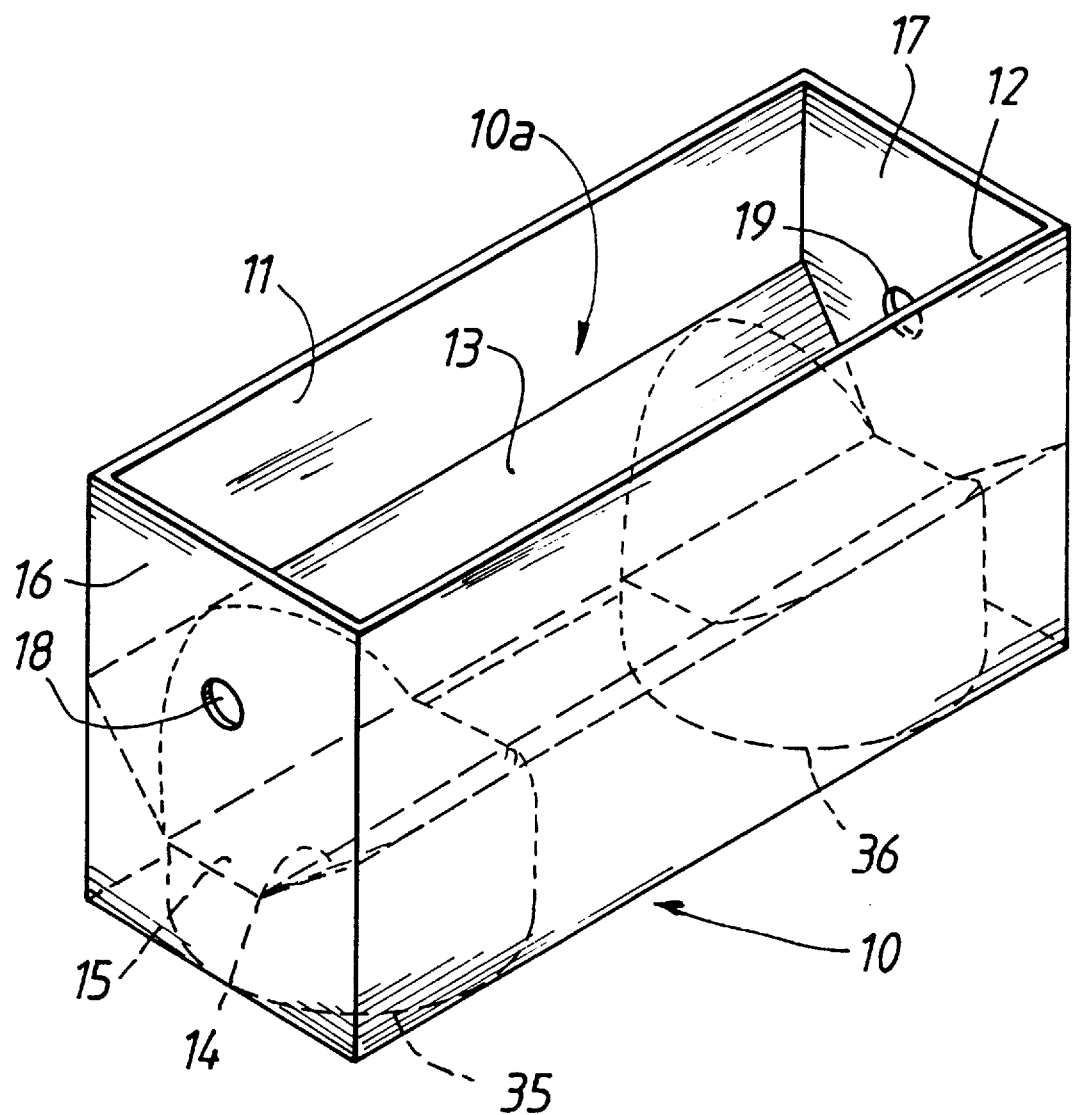
FIG. 1 is a perspective view of the trough of the bread dough mixing device according to the invention.
Figure 2:
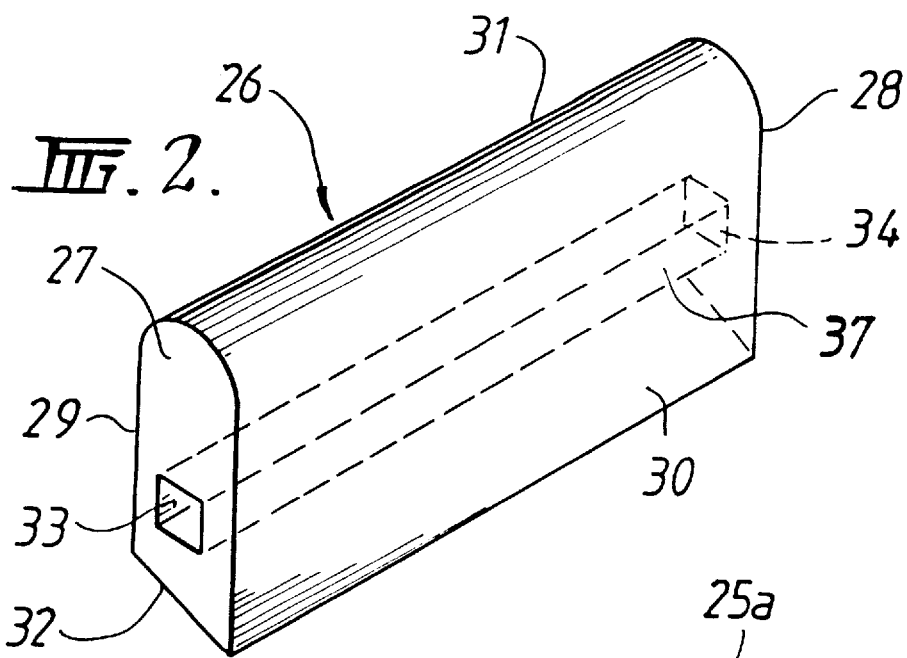
FIG. 2 is a perspective view of one form of beater for the trough of FIG. 1.
Figure 6A:
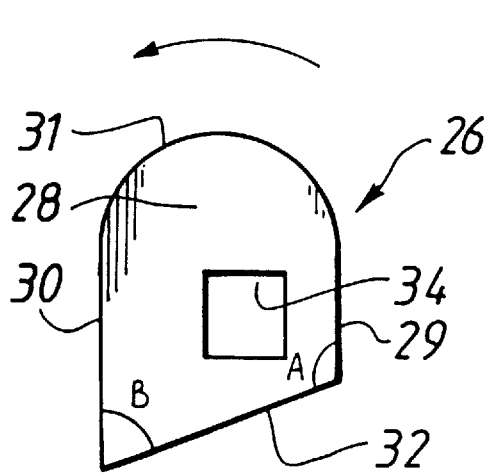
FIG. 6a is an end view of the beater showing the off-set axis of rotation.

Referring to FIG. 2, there is adapted to be rotatably and removably mounted within the trough a beater 26 which can be made of wood, plastics material or metal and which is in the form of an elongated flat plate and has two flat, parallel and small-area end faces 27,28, transverse to the longitudinal axis; two flat and parallel larger-area side faces, 29, 30; one curved top or bottom face 31 and a flat top or bottom face 32 radially opposite the curved top or bottom face 31. The flat top or bottom face is angled, that is to say not square with respect to the two side faces 29 and 30 and thus presents, during rotation of the beater within the trough, obtuse angle A and acute angle B; see FIG. 6A. The obtuse angle A defines a longitudinal leading face of the beater and the acute angle B defines a longitudinal trailing face.

Figure 5:
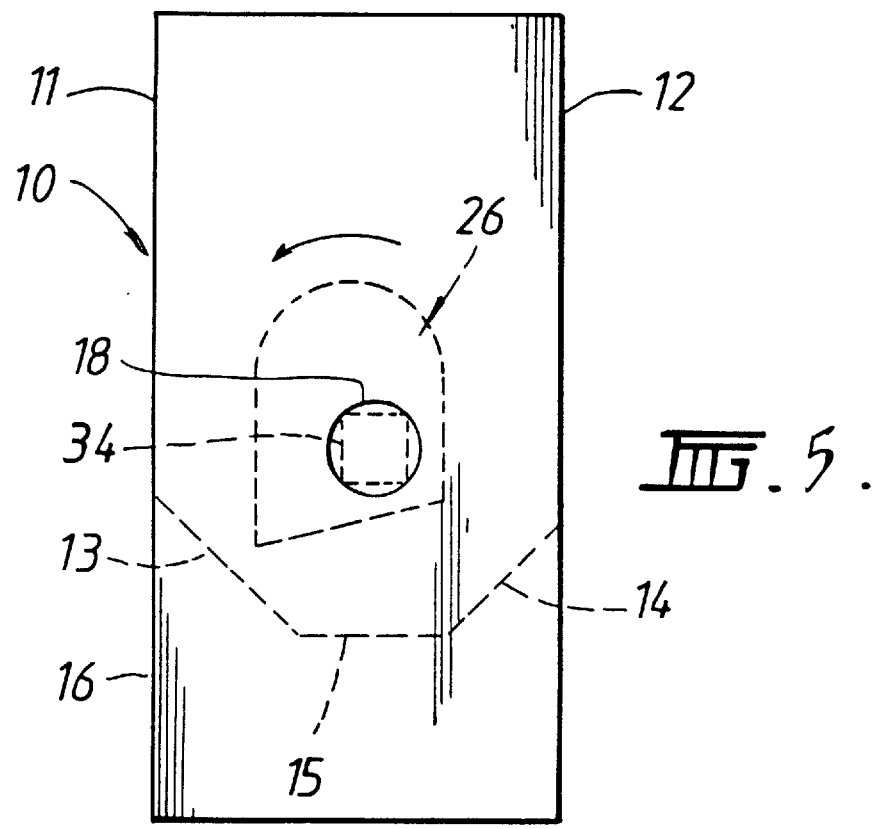
FIG. 5 is a diagrammatic end view of the beater in position within the trough.

Each flat end face of the beater has a square or rectangular socket 33,34, connected by a throughbore or sleeve 37. Each socket is adapted to receive the square (or rectangular) plugs 21,24 placed therein, one plug 21 is formed on the handle 22 while the other plug 24 is formed at one end of a handle-supporting rod or shaft 25 previously described. In the form of the invention illustrated, the beater 26 is of hollow plastics material construction and the sockets are formed as a continuous, rectangular hollow plastics material sleeve or throughbore and each plug is square. The beater 26 is manually rotatable by a handle 22, using the hand grip 22b, the angular direction of rotation of the beater 26 is shown by the acute arrow of FIGS. 5, 6a and 6b.

A pair of cylindrical mounts 35,36 is provided for lever-operated suction caps adapted to be placed into the base of the trough housing and for attachment of the dough-mixing machine of the invention onto a bench.

Figure 6B:
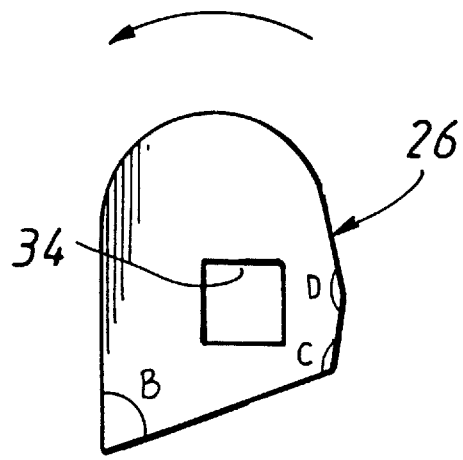
FIG. 6b is an end view of another embodiment of the beater in which the leading face is provided with a longitudinal ridge.

Referring to FIG. 6b, obtuse angle C (which is shown as slightly larger than obtuse angle A of FIG. 6a) and obtuse angle D together define a longitudinal leading face provided with a longitudinal ridge. Acute angle B, as in FIG. 6a, defines a longitudinal trailing face.

An advantage of the design of the beater blade in accordance with the invention is that at all times the blade is surrounded by dough being kneaded and the dough is compressed at every point during rotation. Furthermore the beater blade pushes the dough out of the corners of the angular bottom of the trough.

It will be appreciated that although the device of the invention has been described in the illustrated embodiments as a hand-operated manual device for home bread making, the device could be power-driven for use on a commercial scale by having the shaft of the beater driven by an electric drive motor through a coupling and reduction gear box.

What is claimed is:

1. A device for mixing and kneading dough, comprising:
   (a) a mixing container with side walls, end walls and a bottom wall defining a trough, said end walls substantially at right angles to said bottom wall; and
   (b) a beater having a longitudinal axis adapted to be placed within and removed from the trough, which beater is formed into a blade having
      i. a first longitudinal axial rounded face,
      ii. two opposing side faces, and
      iii. a second longitudinal axial face diametrically opposite to the first rounded face, which second face is angled with respect to said two side faces,
   which beater blade has a throughbore passing axially therethrough or is substantially hollow and has a sleeve passing axially therethrough.

2. The device according to claim 1 wherein the trough comprises:
   (a) parallel upper portions of said side walls; and
   (b) lower side wall portions which slope downwardly and inwardly from said upper side wall portions at an oblique angle to said bottom wall, and wherein the beater blade
      i. is mountable to a shaft plug and a handle plug placeable within, and removable from, the trough; and
      ii. is rotatable by a handle connected to said handle plug.

3. The device according to claim 2, wherein each beater blade side face is provided with a rectangular or square socket, and which device further comprises
   (a) said handle plug incorporating an aperture, which handle plug
      is of complementary shape to the shape of the beater blade side face socket, and
      said handle plug is adapted to be passed through a hole in either end wall of said trough and either of said beater blade sockets for left-hand or right-hand operation; and
      is press-fitted into one of said beater blade sockets, and
   (b) a construction comprising a shaft having a free end and an end connected to said shaft plug and to a knob connected to the shaft plug, which construction is adapted to be passed through one of said trough end wall holes and beater blade sockets such that said shaft free end is press fitted into said handle plug aperture when the handle plug is inserted through (i) the hole in the opposite end wall of said trough and (ii) the opposite beater blade socket after the blade has been placed in the trough.

4. The device according to claim 3 wherein:
   (a) the hole in each trough end wall is circular and defines a circular or cylindrical bearing surface, and
   (b) the handle plug and shaft plug each are connected to an additional corresponding cylindrical bearing surface insertable into said end wall holes to permit rotation of the beater blade when the beater blade is mounted within the trough.

5. The device according to claim 1 wherein the beater blade is generally in the form of an elongated flat plate, and:
   (a) said first longitudinal axial face comprises a top face and edge and said second longitudinal axial face comprises a bottom face and edge, or
   (b) said first longitudinal axial face comprises a bottom face and edge and said second longitudinal axial face comprises a top face and edge,
   both said first and second faces being spaced radially from a shaft inserted longitudinally axially through said blade throughbore or sleeve, and
wherein said blade presents, during rotation, one obtuse-angled leading edge with respect to a longitudinal leading face and an acute-angled trailing edge with respect to a longitudinal trailing face.

6. The device according to claim 5 wherein the longitudinal leading face is provided with a longitudinal ridge.

7. The device according to claim 5, wherein the beater blade, when mounted in the trough, is laterally offset in a direction towards the obtuse-angled leading edge of the blade to obtain a greater sweep of the blade with respect to inside surfaces of the trough.

8. The device according to claim 1, wherein each beater blade side face is provided with a rectangular or square socket, and which device further comprises:
   (a) a handle for rotation of said blade, which handle
      i. is provided with a handle plug incorporating an aperture, which handle plug
         is of complementary shape to the shape of the beater blade side face socket and
         is adapted to be passed through a hole in either end wall of said trough and either of said beater blade sockets for left-hand or right-hand operation; and ii. is press-fitted into one of said beater blade sockets, and (b) a construction comprising a shaft having a free end and an end connected to a shaft plug and to a knob connected to the shaft plug, which construction is adapted to be passed through one of said trough end wall holes and beater blade sockets when said shaft free end is press fitted into said handle plug aperture when the handle plug is inserted through (i) the hole in the opposite end wall of said trough and (ii) the opposite beater blade socket after the blade has been placed in the trough.

9. The device according to claim 8 wherein:

(a) the hole in each trough end wall is circular and defines a circular or cylindrical bearing surface, and (b) the handle plug and shaft plug each are connected to an additional corresponding cylindrical bearing surface insertable into said end wall holes to permit rotation of the beater blade when the beater blade is mounted within the trough.

10. The device according to claim 1, wherein the beater blade is of plastics material construction, is substantially hollow and said sleeve extending axially therethrough is of plastics material.

11. The device according to claim 10, which further comprises a metal shaft connected at one end to a shaft plug and to a knob, which shaft is inserted through one end wall of said trough and one side face of said beater blade and through said sleeve and is press fitted into a corresponding aperture in a handle plug which handle plug is inserted through the other end wall of said trough and the other side face of said beater blade.

12. A device for mixing and kneading dough, comprising:

A. a mixing container having side walls, a first and an opposite end wall, and a bottom wall defining a trough, said end walls substantially at right angles to said bottom wall, which trough comprises
  (i) parallel upper portions of said side walls; and
  (ii) lower side wall portions which slope downwardly and inwardly from said upper side wall portions at an oblique angle to said bottom wall, B. a beater blade generally in the form of an elongated flat plate having a longitudinal axis, which blade:
  is mountable to a shaft plug and a handle plug,
  is placeable within, and removable from, the trough, and
  is rotatable by a handle which is connected to said handle plug,
said beater blade further comprising
  (i) a throughbore or a sleeve extending axially completely therethrough;
  (ii) two narrow-area, flat, opposing side faces transverse to said longitudinal axis, each of which side faces is provided with a rectangular or square socket;
  (iii) a first longitudinal axial rounded face spaced radially from said throughbore or sleeve; and
  (iv) a second longitudinal axial face diametrically opposite to the first longitudinal rounded face, spaced radially from said throughbore or sleeve and angled with respect to said two side faces,
    said first longitudinal face comprising a top face and edge and said second longitudinal face comprising a bottom face and edge, or said first longitudinal face comprising a bottom face and edge and said second longitudinal face comprising a top face and edge;

C. said handle plug adapted to pass through a circular hole in either end wall of said trough and be press fitted in one of said beater blade side face sockets for left-hand or right-hand operation, said trough end wall holes defining a circular or cylindrical bearing surface, wherein the handle plug further
  (i) incorporates an aperture, and
  (ii) is complementary in shape to the shape of the beater blade side face sockets;

D. a construction comprising a shaft having a free end and an end connected to said shaft plug and a knob, which construction
  (i) is adapted to pass through either one of said trough end holes,
  (ii) is adapted to press fit into one of said blade sockets, and
  (iii) is adapted to pass through said sleeve or throughbore in either direction; such that
  once the blade has been placed in the trough and the handle plug has been inserted through the first trough end wall hole and has been press fitted in one beater blade socket, said shaft free end is press fitted into said corresponding handle plug aperture,
  wherein, during rotation, said blade presents one obtuse-angled leading edge with respect to a longitudinal leading face and an acute-angled trailing edge with respect to a longitudinal trailing face, and
  when the blade is mounted in said trough, the blade is laterally offset in a direction towards the obtuse-angled leading edge to obtain a greater sweep with respect to inside surfaces of the trough.

13. The device according to claim 12, wherein said mixing container is of plastics material construction.

14. The device according to claim 13, wherein said beater blade is of plastics material construction.

15. The device according to claim 12, wherein said beater blade is of plastics material construction.

\* \* \* \* \*